United States Patent
Jose et al.

(10) Patent No.: US 12,291,014 B2
(45) Date of Patent: May 6, 2025

(54) MINERAL ADDITIVE MODIFIED BASALT FIBRE BASED PMMA COMPOSITES FOR BALLISTIC APPLICATIONS

(71) Applicant: B/E Aerospace (UK) Limited, Leighton Buzzard (GB)

(72) Inventors: Deepa Jose, Belfast (GB); Nigel J. McKibbin, Northern Ireland (GB)

(73) Assignee: B/E Aerospace (UK) Limited, Leighon Buzzard (GB)

( * ) Notice: Subject to any disclaimer, the term of this patent is extended or adjusted under 35 U.S.C. 154(b) by 54 days.

(21) Appl. No.: 18/236,170

(22) Filed: Aug. 21, 2023

(65) Prior Publication Data

US 2025/0065600 A1 Feb. 27, 2025

(51) Int. Cl.
| | |
|---|---|
| B32B 5/26 | (2006.01) |
| B32B 3/12 | (2006.01) |
| B32B 5/02 | (2006.01) |
| B32B 7/12 | (2006.01) |
| B64D 11/00 | (2006.01) |

(52) U.S. Cl.
CPC .............. *B32B 5/263* (2021.05); *B32B 3/12* (2013.01); *B32B 5/024* (2013.01); *B32B 7/12* (2013.01); *B64D 11/00* (2013.01); *B32B 2250/40* (2013.01); *B32B 2260/023* (2013.01); *B32B 2260/046* (2013.01); *B32B 2262/0269* (2013.01); *B32B 2262/108* (2013.01); *B32B 2307/3065* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 7,601,654 | B2 | 10/2009 | Bhatnagar et al. |
| 7,964,518 | B1 | 6/2011 | Bhatnagar et al. |
| 8,080,486 | B1 | 12/2011 | Bhatnagar et al. |
| 8,361,609 | B2 | 1/2013 | Cosentino |
| 8,765,048 | B2 | 7/2014 | Ruiz et al. |
| 9,562,749 | B2 | 2/2017 | Bhatnagar et al. |

(Continued)

FOREIGN PATENT DOCUMENTS

| | | | | |
|---|---|---|---|---|
| CN | 116512691 | A | * 8/2023 | |
| GB | 2529571 | A | * 2/2016 | ............. B32B 19/06 |

OTHER PUBLICATIONS

Bodaghi et al. (Reactive Processing of Acrylic-Based Thermoplastic Composites: A Mini-Review), Front. Mater., Jun. 15, 2022 Sec. Polymeric and Composite Materials, vol. 9—2022 pp. 1-6. (Year: 2022).*

(Continued)

*Primary Examiner* — Elizabeth Collister
(74) *Attorney, Agent, or Firm* — Suiter Swantz IP

(57) ABSTRACT

A composite panel includes woven fabrics and a polymer composite. The polymer composite includes Poly(methyl methacrylate) (PMMA). The woven fabrics includes basalt fibers. The basalt fibers are mineral-additive modified. Mineral-additive modified basalt fiber based PMMA composites are used for ballistic applications. Alternatives layer of aramid fabric and mineral additive modified basalt fabric based PMMA composites are also used for UV resistant ballistic applications. Lightweight sustainable sandwich ballistic panel are achieved by a reactive thermoplastic route.

15 Claims, 9 Drawing Sheets

(56) References Cited

U.S. PATENT DOCUMENTS

| | | |
|---|---|---|
| 9,636,901 B2 | 5/2017 | Jürgens |
| 9,751,612 B2 | 9/2017 | Fernandez et al. |
| 9,855,721 B2 | 1/2018 | Drexler et al. |
| 9,868,530 B2 | 1/2018 | Burd |
| 10,144,200 B2 | 12/2018 | Luinge et al. |
| 10,252,488 B2 | 4/2019 | Tam et al. |
| 10,414,119 B2 | 9/2019 | Leroy et al. |
| 10,682,820 B2 | 6/2020 | Buchmann et al. |
| 10,961,362 B2 | 3/2021 | Capelot et al. |
| 10,968,296 B2 | 4/2021 | Alsbaiee et al. |
| 11,014,337 B2 | 5/2021 | Stickler et al. |
| 11,292,214 B2 | 4/2022 | Otsuki et al. |
| 11,351,701 B2 | 6/2022 | Nguyen et al. |
| 11,383,503 B2 | 7/2022 | Dalal et al. |
| 11,407,199 B2 | 8/2022 | Tsotsis |
| 11,480,206 B2 | 10/2022 | Weber et al. |
| 11,492,120 B2 | 11/2022 | Burd et al. |
| 11,518,866 B2 | 12/2022 | Sauvage et al. |
| 11,578,159 B2 | 2/2023 | Alsbaiee et al. |
| 11,623,412 B2 | 4/2023 | Bozsak et al. |
| 11,624,347 B2 | 4/2023 | Bozsak et al. |
| 11,649,574 B2 | 5/2023 | Good et al. |
| 2007/0224401 A1 | 9/2007 | Telander |
| 2007/0293109 A1 | 12/2007 | Bhatnagar et al. |
| 2009/0041985 A1 | 2/2009 | Varendorff et al. |
| 2009/0053960 A1 | 2/2009 | Dovell et al. |
| 2010/0285269 A1 | 11/2010 | Telander |
| 2011/0067560 A1 | 3/2011 | Hurst et al. |
| 2011/0143619 A1 | 6/2011 | Luinge et al. |
| 2012/0196108 A1 | 8/2012 | Bhatnagar et al. |
| 2017/0021596 A1 | 1/2017 | Livesay et al. |
| 2017/0299339 A1 | 10/2017 | Bhatnagar et al. |
| 2018/0051142 A1 | 2/2018 | Soltanpour et al. |
| 2019/0016089 A1 | 1/2019 | Bhatnagar et al. |
| 2019/0093989 A1 | 3/2019 | Hanusa et al. |
| 2019/0376212 A1* | 12/2019 | Bryant ............. B32B 5/08 |
| 2020/0346429 A1 | 11/2020 | Burd et al. |
| 2020/0369011 A1 | 11/2020 | Lenzi et al. |
| 2021/0140189 A1 | 5/2021 | White et al. |
| 2021/0403653 A1 | 12/2021 | Swan et al. |
| 2022/0081520 A1 | 3/2022 | Hochstetter et al. |
| 2022/0235239 A1 | 7/2022 | Lima et al. |
| 2022/0258432 A1 | 8/2022 | Staal et al. |
| 2022/0288887 A1 | 9/2022 | Waina et al. |
| 2022/0366886 A1 | 11/2022 | Winkler et al. |
| 2023/0033321 A1 | 2/2023 | Papas et al. |
| 2023/0119745 A1 | 4/2023 | Perdue |

OTHER PUBLICATIONS

Liu et al. (Effect of SiO2, Al2O3 on heat resistance of basalt fiber), Thermochimica Acta, vol. 660, 2018, pp. 56-60, (Year: 2018).*

Bere et al., (Design, Manufacturing and Test of CFRP Front Hood Concepts for a Light-Weight Vehicle), Polymers 2021, 13, 1374, pp. 1-21 (Year: 2021) (Year: 2021).*

Machine translation of CN 116512691A via EPO, translated Dec. 13, 2024 (Year: 2023).*

Compression RTM for production of future aerostructures, Feb. 5, 2020; https://www.compositesworld.com/articles/compression-rtm-for-production-of-future-aerostructures.

European Search Report received in EP Application No. 24195456.9, Dec. 2, 2024, 8 pages.

* cited by examiner

MINERAL ADDITIVE MODIFIED BASALT FIBRE BASED PMMA COMPOSITES FOR BALLISTIC APPLICATIONS

TECHNICAL FIELD

The present invention generally relates to composite panels, and more specifically to composite panels for ballistic applications.

BACKGROUND

Ballistic protection is needed for some interior applications based on polymer matrix composites. An example is Galley composite panel that is being part of a cockpit wall of an A350 aircraft. Current composite based ballistic solution are based on Aramid fabric and a thermoset resin which have disadvantages like UV sensitivity, high cost, and the like. There is a need for sustainable composite based solutions that could bring in cost reduction, weight reduction, and better UV resistance. Therefore, it would be advantageous to provide a device, system, and method that cures the shortcomings described above.

SUMMARY

A composite panel is described. The composite panel includes a top woven fabric. The composite panel includes a bottom woven fabric. Each of the top woven fabric and the bottom woven fabric comprise a plurality of basalt fibers. The composite panel includes a plurality of inner woven fabrics. The plurality of inner woven fabrics are disposed between the top woven fabric and the bottom woven fabric. The composite panel includes a polymer matrix. The polymer matrix comprises Poly(methyl methacrylate) (PMMA). The top woven fabric, the bottom woven fabric, and the plurality of inner woven fabrics are impregnated by the polymer matrix.

In some embodiments, the PMMA is formed by in-situ polymerization of at least a plurality of acrylate monomers.

In some embodiments, the plurality of acrylate monomers are (meth)acrylic monomers.

In some embodiments, the plurality of basalt fibers are mineral-additive modified basalt fibers.

In some embodiments, the mineral-additive comprises at least one of copper or aluminum.

In some embodiments, the polymer matrix comprises a fire-retardant additive.

In some embodiments, the plurality of inner woven fabrics comprise the plurality of basalt fibers.

In some embodiments, the plurality of inner woven fabrics comprise a plurality of aramid fibers.

In some embodiments, the plurality of inner woven fabrics comprises a plurality of inner basalt fiber woven fabrics and a plurality of inner aramid fiber woven fabrics.

In some embodiments, the plurality of inner woven fabrics alternate between the plurality of inner basalt fiber woven fabrics and the plurality of inner aramid fiber woven fabrics.

In some embodiments, the composite panel comprises a honeycomb structure. The honeycomb structure is disposed between the top woven fabric and the bottom woven fabric.

In some embodiments, the honeycomb structure is disposed between two or more of the plurality of inner woven fabrics.

In some embodiments, the honeycomb structure is impregnated by the polymer matrix.

In some embodiments, the composite panel includes a top laminate. The top laminate comprises the top woven fabric. The composite panel includes a first adhesive film. The top laminate is adhered to the honeycomb structure by the first adhesive film. The composite panel includes a bottom laminate. The bottom laminate comprises the bottom woven fabric. The composite panel includes a second adhesive film. The bottom laminate is adhered to the honeycomb structure by the second adhesive film.

An aircraft monument is described. The aircraft monument includes a composite panel. The composite panel includes a top woven fabric. The composite panel includes a bottom woven fabric. Each of the top woven fabric and the bottom woven fabric comprise a plurality of basalt fibers. The composite panel includes a plurality of inner woven fabrics. The plurality of inner woven fabrics are disposed between the top woven fabric and the bottom woven fabric. The composite panel includes a polymer matrix. The polymer matrix comprises Poly(methyl methacrylate) (PMMA). The top woven fabric, the bottom woven fabric, and the plurality of inner woven fabrics are impregnated by the polymer matrix.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
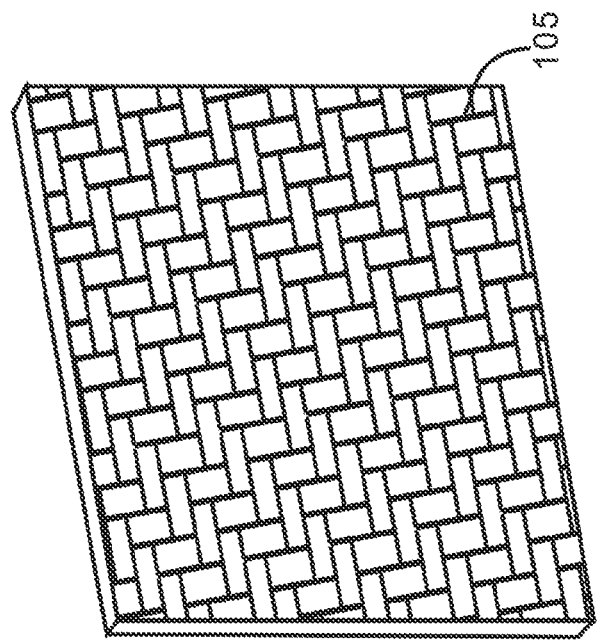
FIG. 1A depicts a perspective view of a composite panel, in accordance with one or more embodiments of the present disclosure.
Figure 1B:
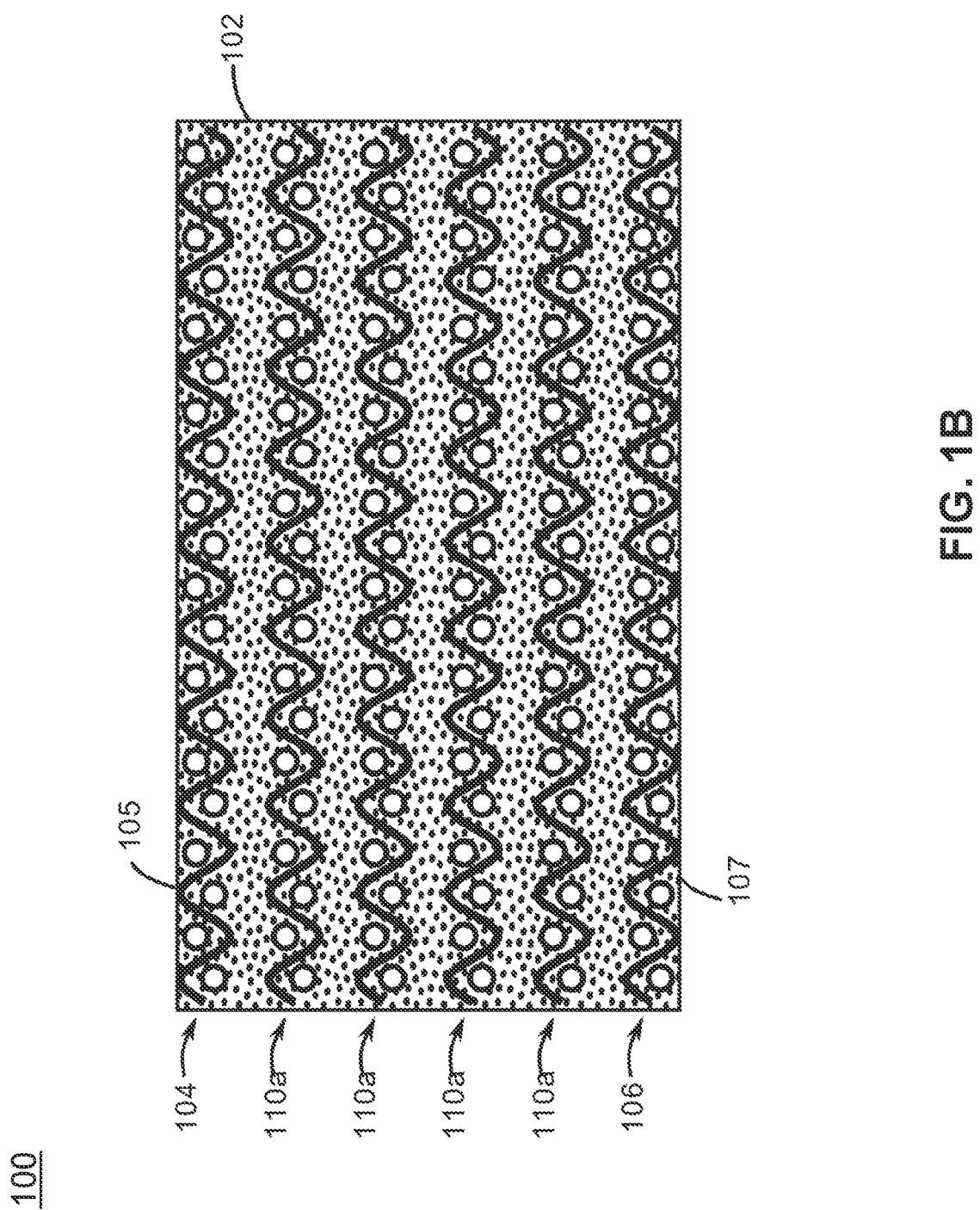
FIG. 1B depicts a side view of a composite panel including inner basalt fiber woven fabrics, in accordance with one or more embodiments of the present disclosure.
Figure 1C:
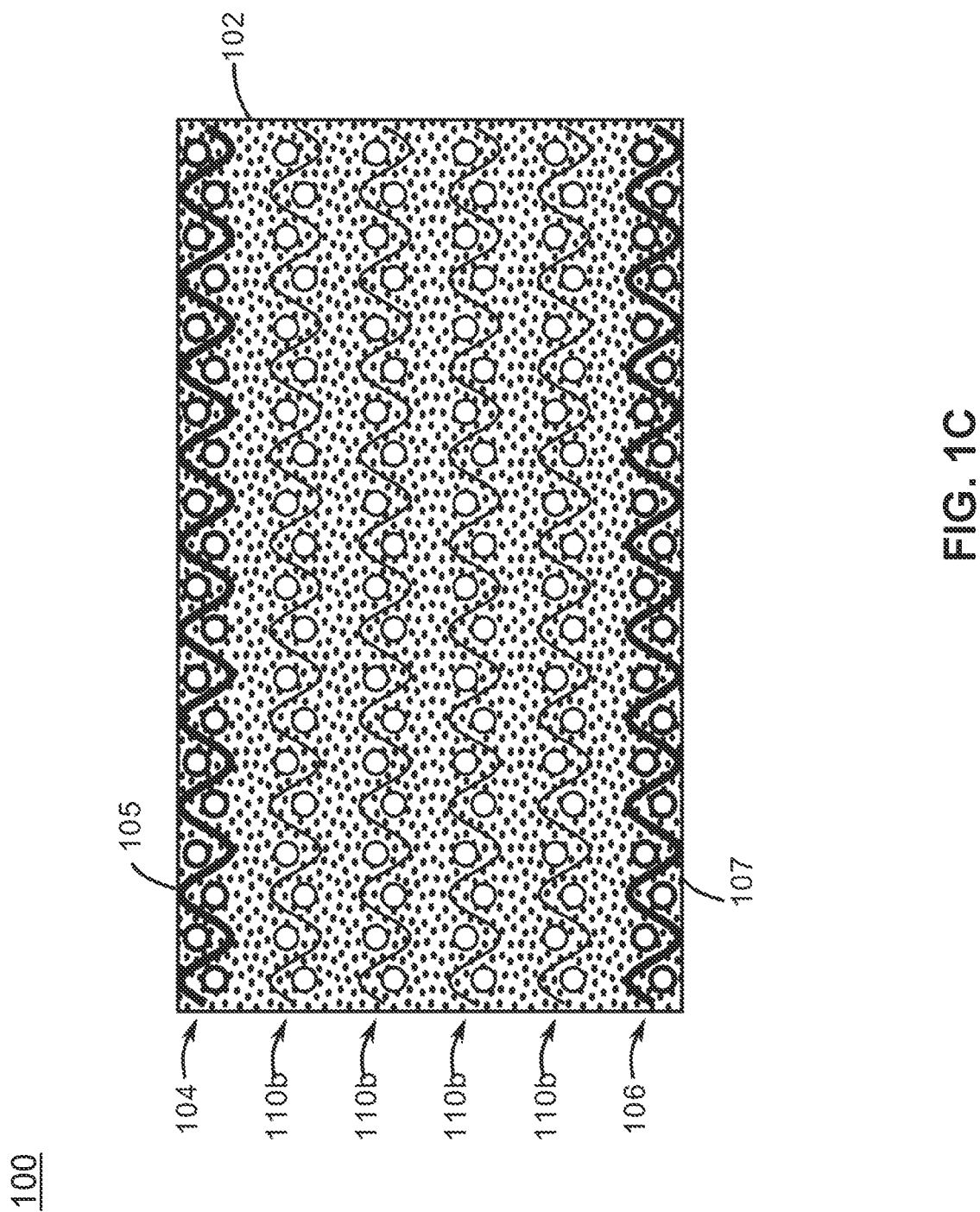
FIG. 1C depicts a side view of a composite panel including inner aramid fiber woven fabrics, in accordance with one or more embodiments of the present disclosure.
Figure 1D:
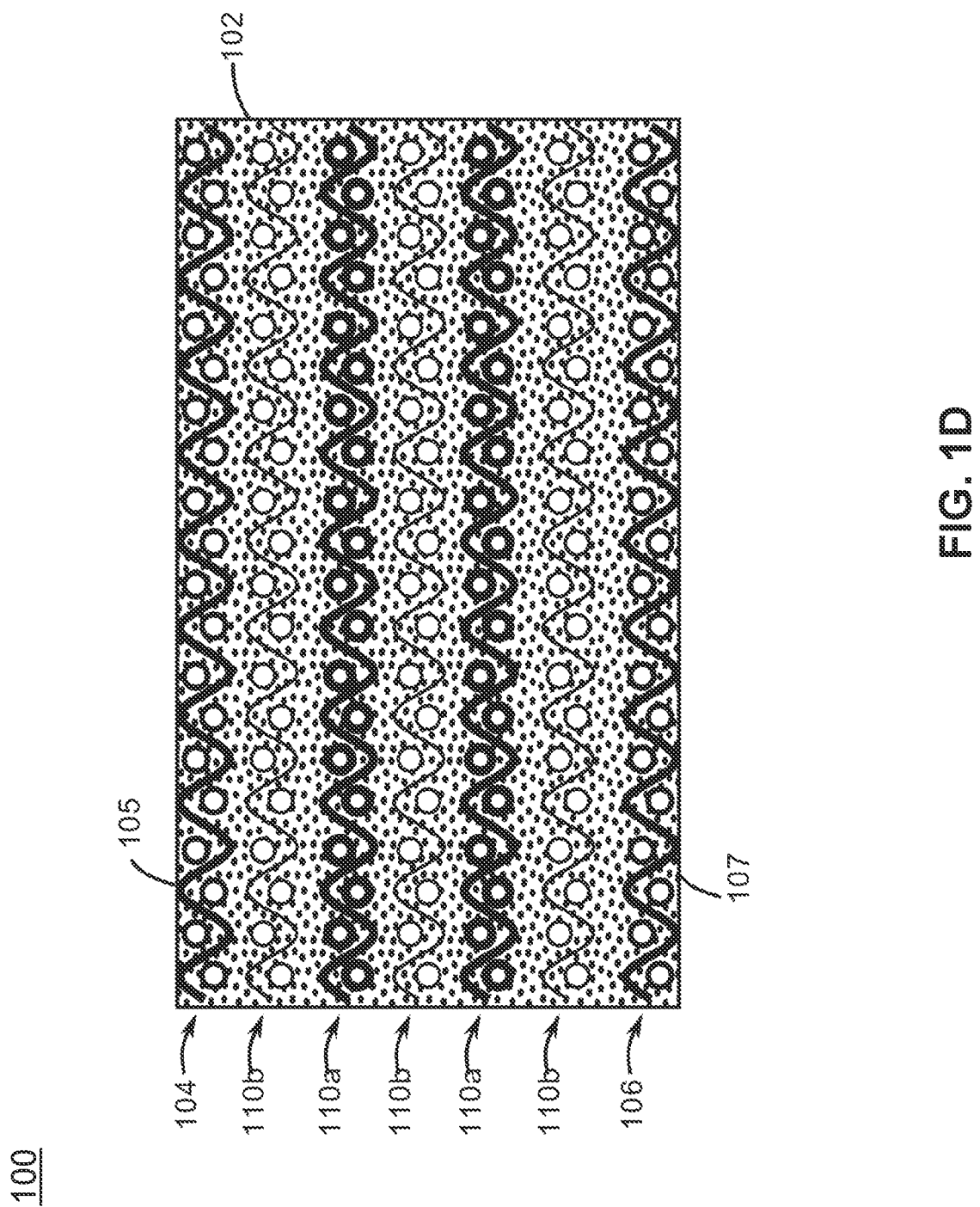
FIG. 1D depicts a side view of a composite panel including alternating inner basalt fiber woven fabrics and inner aramid fiber woven fabrics, in accordance with one or more embodiments of the present disclosure.
Figure 1E:
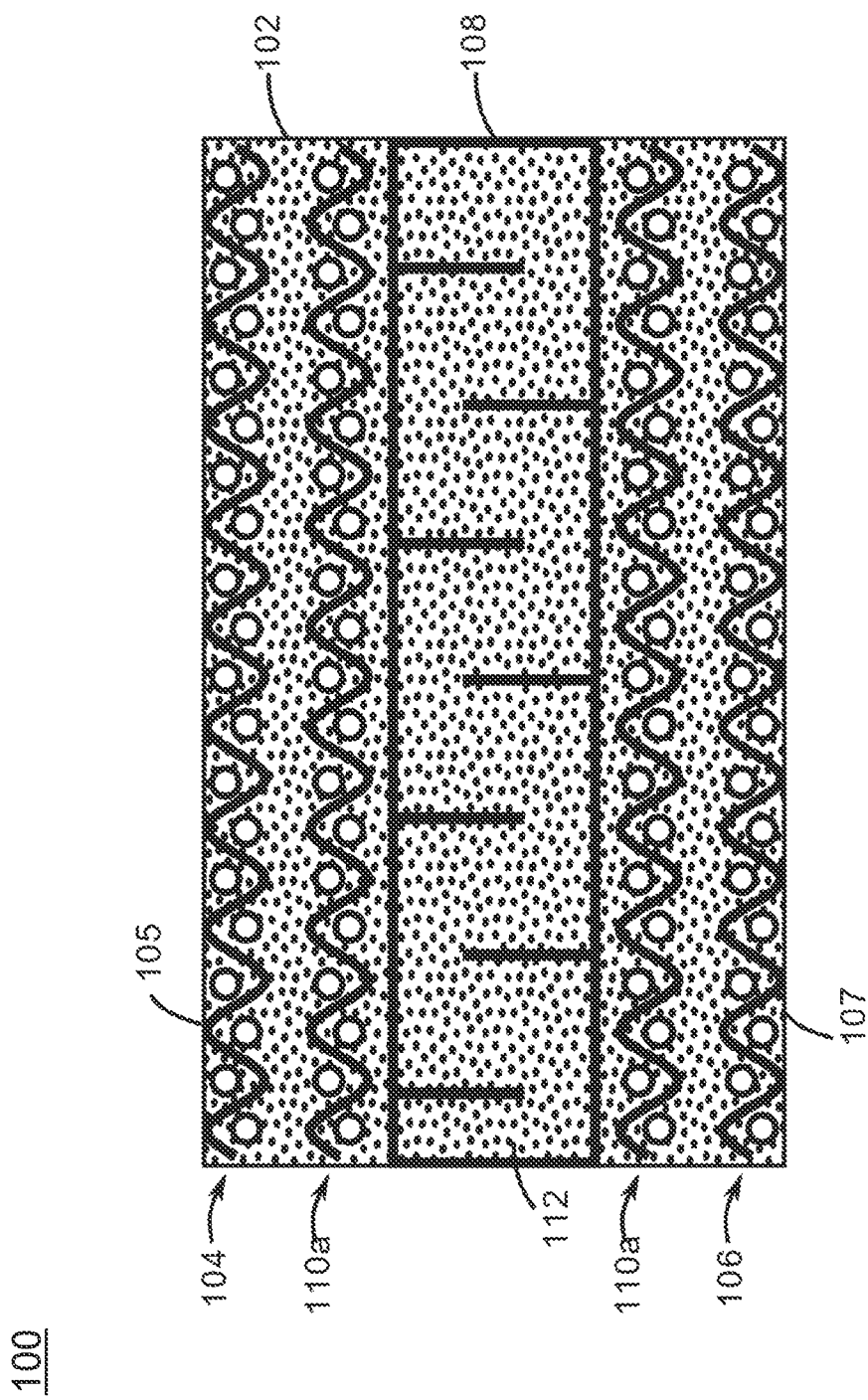
FIG. 1E depicts a side view of a composite panel including inner basalt fiber woven fabrics and a honeycomb structure, in accordance with one or more embodiments of the present disclosure.
Figure 1F:
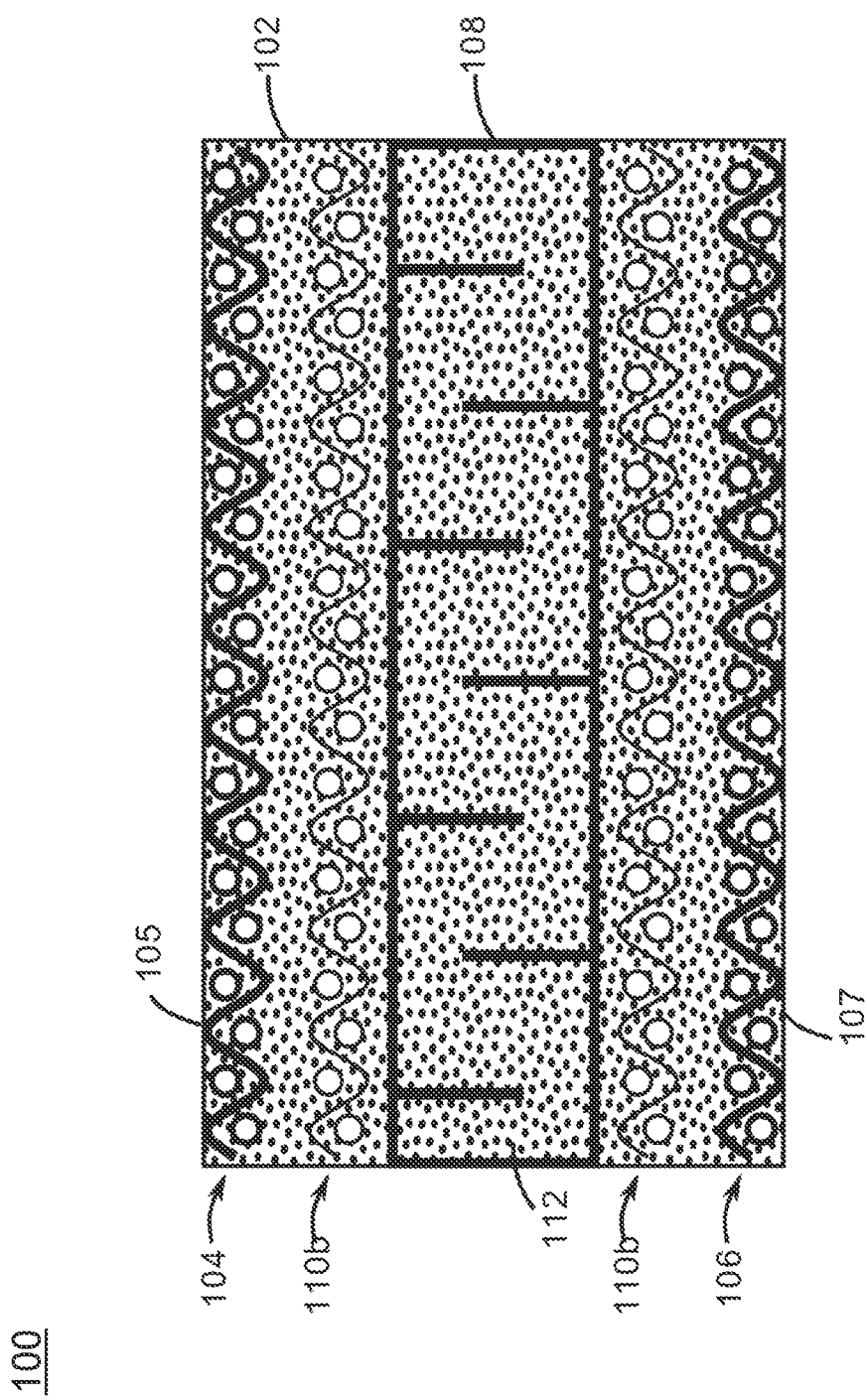
FIG. 1F depicts a side view of a composite panel including inner aramid fiber woven fabrics and a honeycomb structure, in accordance with one or more embodiments of the present disclosure.
Figure 1G:
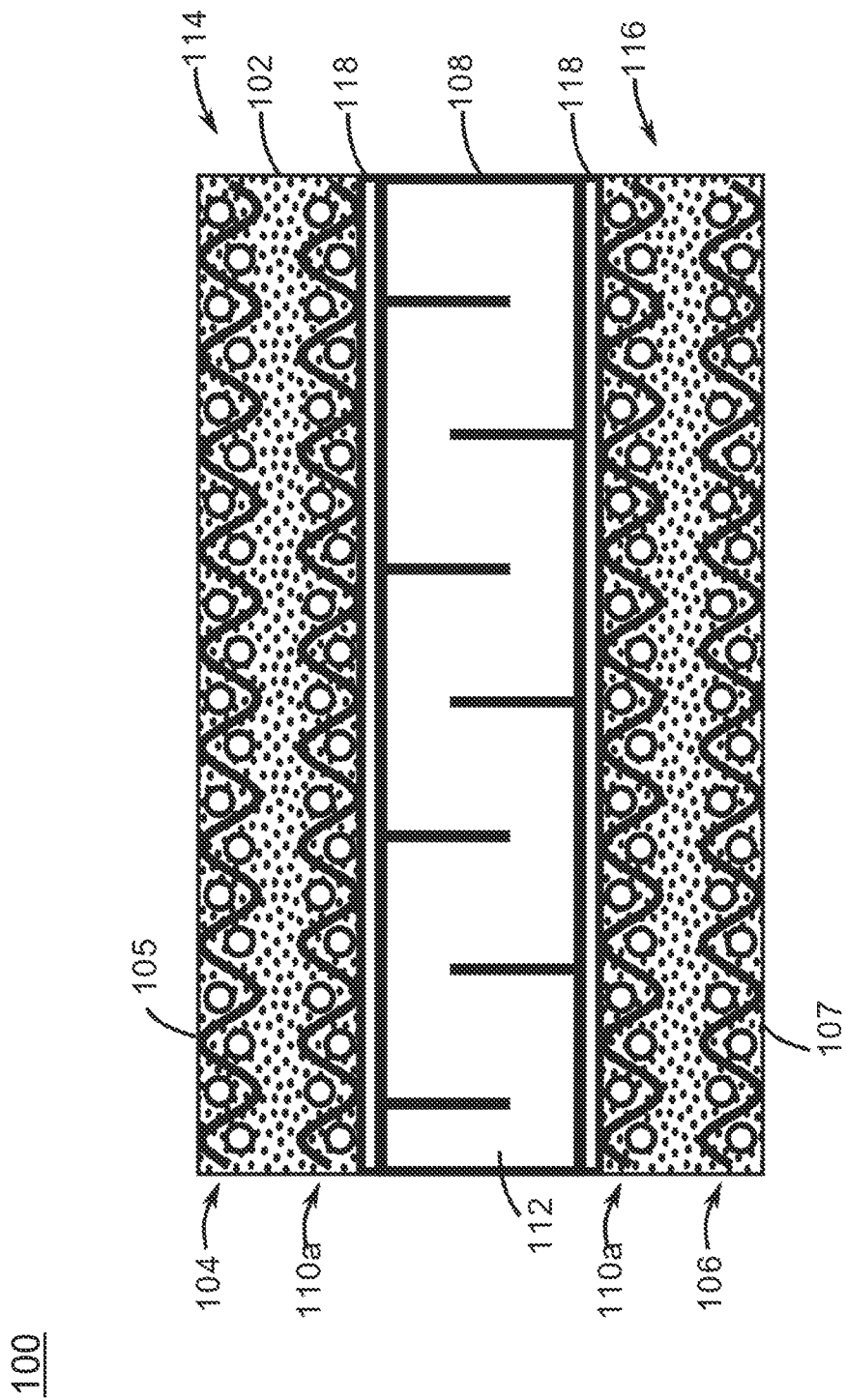
FIG. 1G depicts a side view of a composite panel including top and bottom laminates each including inner basalt fiber woven fabrics, in accordance with one or more embodiments of the present disclosure.
Figure 1H:
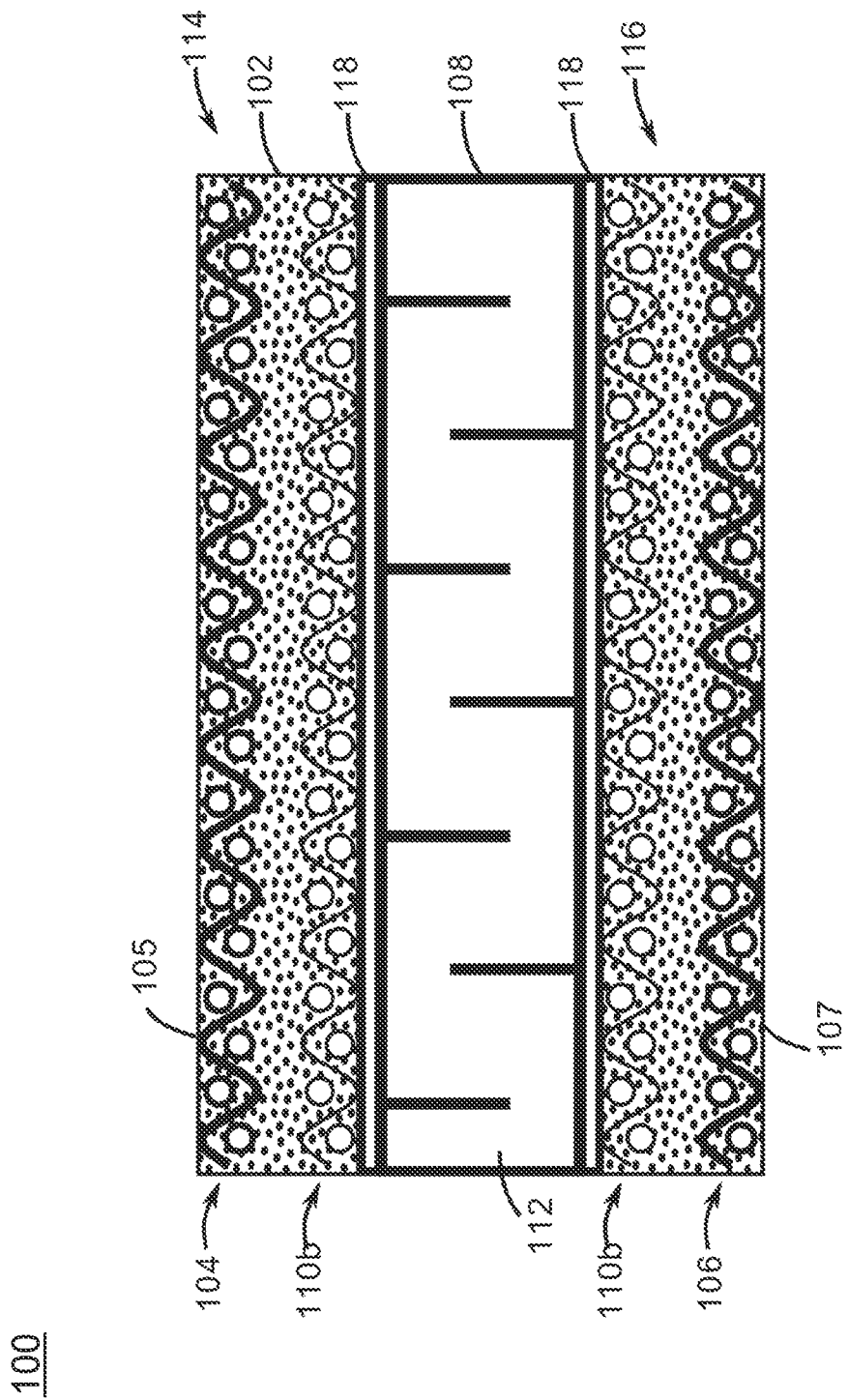
FIG. 1H depicts a side view of a composite panel including top and bottom laminates each including inner aramid fiber woven fabrics, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are directed to mineral additive modified basalt fiber based PMMA composites for ballistic applications. Embodiments of the present disclosure are also directed to alternative layer of aramid fabric and mineral additive modified basalt fabric based PMMA composites for UV resistant ballistic applications. Embodiments of the present disclosure are also directed to lightweight sustainable sandwich ballistic panel by reactive thermoplastic route.

U.S. Pat. No. 7,601,654, titled "Molded ballistic panel with enhanced structural performance"; U.S. Patent Publication Number 2022/0288887, titled "Impact and knife cut resistant pre-impregnated woven fabric for aircraft heated floor panels"; U.S. Patent Publication Number 2020/0369011, titled "Fire retardant veil for use in composite materials"; U.S. Patent Publication Number 2017/0021596, titled "Fiber Reinforced Core"; U.S. Pat. No. 11,624,347, titled "Wind turbine blade made of thermoplastic polymer composite, part of said blade and production method"; U.S. Patent Publication Number 2021/0403653, titled "Acrylic composites with improved surface properties"; U.S. Pat. No. 11,623,412, titled "Process for manufacturing thermoplastic polymer composite parts, and object obtained by said process"; U.S. Patent Publication Number 2019/0016089, titled "Materials gradient within armor for balancing the ballistic performance"; U.S. Patent Publication Number 2020/0346429, titled "Aircraft Monument Composite Construction Using Carbon Uni-Directional Spread Flat Tow Woven Fabric"; U.S. Pat. No. 11,492,120, titled "Ultra light weight composite aircraft galley architecture"; U.S. Pat. No. 11,014,337, titled "Laminate structures comprising fiber-reinforced thermoplastic prepreg plies"; U.S. Patent Publication Number 2023/0033321, titled "Fire resistant thermoplastic-based resin for fiber-reinforced composites"; are incorporated herein by reference in the entirety.

Referring now to FIGS. 1A-1H, a composite panel 100 is described, in accordance with one or more embodiments of the present disclosure. The composite panel 100 may also be referred to as a ballistic panel, a fiber-reinforced plastic panel, or the like. The composite panel 100 is a composite of one or more components, such as, but not limited to, a polymer matrix 102, woven fabrics (e.g., top woven fabric 104, bottom woven fabric 106, inner woven fabrics 110), honeycomb structure 108, and the like. The top woven fabric 104, the bottom woven fabric 106, and the inner woven fabrics 110 are collectively referred to as woven fabrics. The top woven fabric 104, bottom woven fabric 106, inner woven fabrics 110, and/or the honeycomb structure 108 may be arranged in parallel. The top woven fabric 104, bottom woven fabric 106, inner woven fabrics 110, and/or the honeycomb structure 108 may be arranged in parallel to form a panel which is planar.

The composite panel 100 includes the polymer matrix 102. The term "matrix" represents a binder material, such as a polymeric binder material, that binds the woven fabrics together. The "polymer matrix" comprises polymers but may also comprise other compounds or materials. In some embodiments, the polymer matrix 102 comprises Poly(methyl methacrylate) (PMMA). PMMA may also be referred to as acrylic glass. PMMA refers to homopolymers of methyl methacrylate (MMA) and/or copolymers of MMA. Homopolymers of MMA means a polymer grouping of identical MMA. Copolymers of MMA means a polymer grouping together several different monomer units of MMA. The weight ratio of MMA in the PMMA is preferably at least 60% by weight for the MMA copolymer.

In some embodiments, the PMMA is formed by in-situ polymerization of acrylate monomers. Polymerization refers to converting one or more monomers into a polymer. The acrylate monomers are a thermoplastic resin. The thermoplastic resin is in a monomer form as the thermoplastic are infused with the woven fabrics and then polymerized. The viscosity of the acrylate monomers are compatible with infusion and/or liquid processing. The viscosity of the acrylate monomers are relatively low. For example, the viscosity of the acrylate monomers may be near 0.01 poise. In-situ polymerization refers to the final polymerization of the polymer matrix 102 around the woven fabrics. The acrylate monomers may include acrylic monomers, aromatic monomers, aliphatic monomers, and the like. For example, the acrylate monomers may include methacrylate, (meth) acrylic monomers, and the like. In some embodiments, the acrylate monomers are commercially available as Elium® resin.

The polymer matrix 102 is a thermoplastic. The thermoplastic is reversibly hardened by curing. The thermoplastic may be reversed to a liquid state by application of heat to the thermoplastic. The thermoplastic is a solid material at room temperature. The thermoplastic softens at a glass transition temperature (Tg), and liquefies at a melting point (Tm). The composite panels 100 may be welded by heating the polymer matrix 102 above the glass transition temperature (Tg). Welding may be desirable to reduce a cost and weight of the composite panels 100. The polymer matrix 102 also include a melting point. The melting point is above the glass transition temperature.

The polymer matrix 102 has a high energy absorbance. For example, PMMA is highly amorphous and has a good impact strength. The polymer matrix 102 has energy absorbance which is comparable with thermoset matrices, such as phenolic matrices.

In some embodiments, the polymer matrix 102 comprises one or more additives. The additives do not significantly alter the viscosity of the acrylic monomers which are polymerized to form the polymer matrix 102. Thus, the acrylic monomers with the additives may freely flow to impregnate the woven fabrics.

The additives may include fire retardant. Thus, the polymer matrix 102 may be referred to as a fire-retardant additive polymer matrix. The fire retardant may improve the fire resistance properties of the polymer matrix 102. The fire retardant may include any type of fire retardant compatible with PMMA. For example, the fire retardant may include organic fire retardant and/or inorganic fire retardant. By way of another example, the fire retardant may include a halogenated fire retardant and/or a non-halogenated fire retardant. In some embodiments, the fire retardant is an aryl phosphate. For example, the aryl phosphate may include Triphenyl Phosphate (TPP), Isopropylated triphenyl phosphate (PrTPP), Isodecyl diphenyl phosphate (IDPP), Tricresyl Phosphate (TCP), 2-ethylhexyl diphenyl phosphate (EHDP), Isopropyl phenyl diphenyl phosphate. In some embodiments, the overall weight percentage of the fire retardant may be between 5 and 15% of the polymer matrix 102.

The composite panel 100 also includes the woven fabrics. For example, the composite panel 100 includes the top woven fabric 104, the bottom woven fabric 106, and/or the inner woven fabrics 110. The number of woven fabrics is selected to achieve a desired level of ballistic resistance in combination with a desired thickness and/or weight. In some embodiments, the number of woven fabrics may be between 4 and 16 layers of woven fabric (i.e., between 2 and 14 of the inner woven fabrics 110). In some embodiments, the number of woven fabrics may be between 12 to 16 layers of woven fabric (i.e., between 10 and 14 layers of the inner woven fabrics 110).

The top woven fabric 104 is disposed adjacent to a top surface 105 of the composite panel 100. In this regard, the top woven fabric 104 may be considered on top of all other woven fabrics of the composite panel. The bottom woven fabric 106 is disposed adjacent to a bottom surface 107 of the composite panel 100. In this regard, the bottom woven fabric 106 may be considered on bottom of all other woven fabrics of the composite panel 100. The inner woven fabrics 110 are disposed between the top woven fabric 104 and the bottom woven fabric 106. In this regard, the inner woven fabrics 110 are considered inner or between the top woven fabric 104 and bottom woven fabric 106.

In some embodiments, the top woven fabric 104, the bottom woven fabric 106, and/or the inner woven fabrics 110 are dry fabric. A dry fabric refers to a fabric which is not a pre-impregnated with a resin. For example, the woven fabrics are not pre-impregnated with resin before being impregnated by the polymer matrix 102. The woven fabrics may include a much longer shelf life before being assembled in the composite panel 100 by being the dry fabric. It is contemplated that the composite panel 100 may achieve a significant cost savings due to the use of the dry fabric.

In some embodiments, the top woven fabric 104, the bottom woven fabric 106, and/or the inner woven fabrics 110 may be woven according to a weave pattern. The weave pattern may include any weave pattern compatible with the basalt fibers and the aramid fibers. For example, the weave pattern may include, but is not limited to, plain, twill, helicoid, two-by-two, satin, and the like.

Each of the top woven fabric 104, the bottom woven fabric 106, and/or the inner woven fabrics 110 may include a warp fiber and a weft fiber. The warp fiber and weft fiber are each made of the fiber material of the woven fabrics (e.g., basalt fibers and/or aramid fibers). The warp fibers and weft fibers also define the weave pattern of the top woven fabric 104, the bottom woven fabric 106, and/or the inner woven fabrics 110. The warp fibers and weft fibers run longitudinally and transversely, respectively. The warp fibers and weft fibers define voids between the warp fibers and the weft fibers. The voids may also be referred to as gaps. The polymer matrix is impregnated in the voids. The polymer matrix then secures the fibers.

The polymer matrix 102 impregnates the top woven fabric 104, bottom woven fabric 106, inner woven fabrics 110, and/or honeycomb structure 108. Impregnated may refer to infusing, being coated on, encapsulated, or otherwise embedded in. The top woven fabric 104, the bottom woven fabric 106, the inner woven fabrics 110, and/or the honeycomb structure 108 are initially impregnated by a liquid resin including the acrylate monomers. The acrylate monomers are then polymerized in-situ to form the polymer matrix 102. The polymerization may also be referred to as curing. The polymerization of the polymer matrix 102 may be facilitated by heat and/or pressure. The polymer matrix 102 chemically bonds with the top woven fabric 104, the bottom woven fabric 106, the inner woven fabrics 110, and/or the honeycomb structure 108. The polymer matrix 102 fills in voids within and between the top woven fabric 104, the bottom woven fabric 106, the inner woven fabrics 110, and/or the honeycomb structure 108. The polymer matrix 102 then holds the top woven fabric 104, the bottom woven fabric 106, the inner woven fabrics 110, and/or the honeycomb structure 108 together. For example, the polymer matrix 102 is disposed around the fibers of the top woven fabric 104, the bottom woven fabric 106, the inner woven fabrics 110, and/or the honeycomb structure 108. For instance, the polymer matrix 102 fills voids gaps between the warp fiber and weft fibers of the woven fabrics. By way of another example, the polymer matrix 102 is disposed within the cells of the honeycomb structure 108. Thus, the polymer matrix 102 acts as a unitary layer with the top woven fabric 104, the bottom woven fabric 106, the inner woven fabrics 110, and/or the honeycomb structure 108.

In some embodiments, the woven fabrics have a decomposition temperature. For example, the woven fabrics may include a decomposition temperature of around 450° C. where the woven fabrics comprise aramid fibers. By example, the woven fabrics may include a decomposition temperature of around 720° C. where the woven fabrics comprise basalt fibers. The decomposition temperature of the woven fabrics is higher than the melting point of the polymer matrix 102. The composite panels 100 may be heated above the melting point of the polymer matrix 102 and below the decomposition temperature of the woven fabrics to allow the polymer matrix 102 to be liquified. Once the polymer matrix 102 is liquified, the woven fabrics may be removed from the polymer matrix 102. The woven fabrics may then be recycled. Thus, at least the woven fabrics of the composite panel 100 may be considered recyclable. The recyclability of the woven fabrics is desirable to increase the sustainability of the composite panels 100.

The top woven fabric 104, the bottom woven fabric 106, and the inner woven fabrics 110 comprise one or more materials. The top woven fabric 104 and the bottom woven fabric 106 comprises basalt fibers. The woven fabrics may be referred to as a basalt fiber woven fabrics, where the woven fabrics includes basalt fibers. In some embodiments, the top woven fabric 104, the bottom woven fabric 106, and one or more of the inner woven fabrics 110 comprises basalt fibers. The inner woven fabrics 110 may be referred to as inner basalt fiber woven fabrics 110*a* where the inner woven fabrics 110 comprise the basalt fibers. The warp fibers and weft fibers of the top woven fabric 104, the bottom woven fabric 106, and/or the inner woven fabrics 110 may comprise the basalt fibers.

The basalt fibers have a high energy absorption and a high strain to break compared to carbon fiber. In some embodiments, the basalt fibers are not hygroscopic. In some embodiments, the basalt fibers are also not UV sensitive. For example, the basalt fibers are less hygroscopic and less UV sensitive than aramid fibers. The basalt fibers are desirable for use in top and bottom woven fabric layers of the composite panel 100 due to not being hygroscopic and not being UV sensitive.

In some embodiments, the basalt fibers are mineral-additive modified basalt fibers. The woven fabrics may be referred to as mineral-modified basalt fiber woven fabrics, where the woven fabrics includes mineral-modified basalt fibers. The basalt fibers are be modified by adding a mineral-additive to the basalt fibers. The mineral-additive may any mineral-additive compatible with the basalt fibers. For example, the mineral-additive may include copper, aluminum, or the like. In some embodiments, the mineral-additive modified basalt fibers are commercially available as Filava® fibers. By including the mineral-additive modified basalt fibers and the PMMA polymer matrix, the composite panel 100 may also be referred to as a mineral-additive modified basalt fiber based PMMA composites for ballistic applications.

The mineral-additive modified basalt fibers may include improved mechanical performance over non-modified basalt fibers. For example, the mineral-additive modified basalt fibers may include a tensile strength of between 3,400 and 3,700 MPa when impregnated by the polymer matrix 102. The non-modified basalt fibers may include a tensile strength of between 2,200 and 3,000 MPa when impregnated by the polymer matrix 102. By way of another example, the mineral-additive modified basalt fibers may include a Youngs modulus when impregnated by the polymer matrix 102 of between 88 and 94 GPa. The non-modified basalt fibers may include a Youngs modulus when impregnated by the polymer matrix 102 of between 80 and 85 GPa. By way of another example, the mineral-additive modified basalt fibers may include a tensile strain when impregnated by the polymer matrix of 2.4%. The non-modified basalt fibers may include a tensile strain when impregnated by the polymer matrix of 2.0%. Thus, the mineral additive may be desirable to improve the mechanical performance of the composite panels 100.

In some embodiments, one or more of the inner woven fabrics 110 comprise aramid fibers. The inner woven fabrics 110 may be referred to as inner aramid fiber woven fabrics 110*b* where the inner woven fabrics 110 comprise the aramid fibers. The warp fibers and weft fibers of the inner woven fabrics 110 may comprise the aramid fibers.

Aramid may also be referred to as aromatic polyamide. The aramid fibers may include para-aramid fibers and/or meta-aramid fibers. For example, the aramid fibers may include KEVLAR® para-aramid fibers, NOMEX® meta-aramid fibers, and the like. In some embodiments, the aramid fibers have a high tensile strain. The aramid fibers have a tensile strain which is higher than the non-modified basalt fiber and the mineral-additive modified basalt fibers. For example, the aramid fibers have a tensile strain of 2.5%. The tensile strain of the aramid fibers is desirable for use in the composite panel 100, to allow the composite panel 100 to deform and absorb energy from a bullet without breaking the aramid fibers.

In some embodiments, the aramid fibers are hygroscopic. The aramid fibers absorb water by being hygroscopic. In some embodiments, the aramid fibers are UV sensitive. The aramid fibers degrade or disintegrate with UV light by the UV sensitivity. The hygroscopic and UV sensitivity of the aramid fibers thus causes the aramid fibers to be raise challenges with ensuring the composite panel 100 has a sufficient service life. The inner woven fabrics 110 are covered by the top woven fabric 104 and the bottom woven fabric 106. The top woven fabric 104 and the bottom woven fabric 106 act as UV barriers and water barriers for the inner woven fabrics 110. The top woven fabric 104 and the bottom woven fabric 106 comprising the basalt fiber remedies defects associated with the UV sensitivity and the hygroscopic nature of the inner woven fabrics 110 comprising the aramid fibers.

In some embodiments, the inner woven fabrics 110 alternates between the inner basalt fiber woven fabrics 110*a* and inner aramid fiber woven fabrics 110*b*. In this regard, the fibers of the inner woven fabrics 110 alternate between the basalt fibers and the aramid fibers.

In some embodiments, the composite panel 100 includes the honeycomb structure 108. The honeycomb structure 108 may also be referred to as a honeycomb panel or a honeycomb layer. The honeycomb structure 108 may be desirable to improve the mechanical strength of the composite panel 100 without significantly increasing the thickness of the composite panel 100. The composite panel 100 may include a thickness of 5 and 10 mm where the composite panel 100 includes the honeycomb structure 108.

The honeycomb structure 108 may be considered a core of the composite panel 100. The honeycomb structure 108 is disposed between the top woven fabric 104 and bottom woven fabric 106. The honeycomb structure 108 may also be disposed between two or more of the inner woven fabrics 110. For example, a first set of one or more of the inner woven fabrics 110 are disposed between the honeycomb structure 108 and the top woven fabric 104. By way of another example, a second set of one or more of the inner woven fabrics 110 are disposed between the honeycomb structure 108 and the bottom woven fabric 106. The honeycomb structure 108 is disposed between the first set of the inner woven fabrics 110 and the second set of the inner woven fabrics 110.

In some embodiments, the honeycomb structure 108 comprises an aramid material. For example, the honeycomb structure 108 may be made of a para-aramid and/or a meta-aramid. In some embodiments, the honeycomb structure 108 is a meta-aramid which is commercially available as NOMEX® honeycomb.

The honeycomb structure 108 includes cells 112. For example, the honeycomb structure 108 may include alternating single-walled and double-walled cells. The cells 112 may include a geometric shape. For example, the cells 112 may include hexagonal shape, or the like. Open portions of the cells 112 of the honeycomb structure 108 face the woven fabrics.

In some embodiments, the polymer matrix 102 impregnates each of the top woven fabric 104, the bottom woven fabric 106, and the honeycomb structure 108. The polymer matrix 102 fills the cells of the honeycomb structure 108 by impregnating the honeycomb structure 108. For example, the polymer matrix 102 impregnates the cells 112. The polymer matrix 102 then mechanically binds the honeycomb structure 108 to the top woven fabric 104, the bottom woven fabric 106, and the inner woven fabrics 110. The polymer matrix 102 may improve the mechanical performance of the honeycomb structure 108 by impregnating the honeycomb structure 108. For example, the polymer matrix 102 may stabilize the cells of the honeycomb structure 108. In some embodiments, the honeycomb structure 108 impregnated by the polymer matrix 102 may include a density which is 30-40% lower than that of the woven fabrics impregnated by the polymer matrix 102. In some embodiments, the polymer matrix 102 spans across each of the top woven fabric 104, the bottom woven fabric 106, the inner woven fabrics 110, and the honeycomb structure 108. The polymer matrix 102 is then a rigid unit which is not separated by adhesive films. It is contemplated that forming the polymer matrix 102 as a rigid unit may be desirable to improve a shear strength of the composite panel 100. Additionally, the composite panel 100 may be made without separate fabrication steps for forming top laminates and bottom laminates. Instead, the composite panel 100 may be made in one fabrication step by RTM of a preform using the reactive thermoplastic monomer resin.

In some embodiments, the composite panel 100 includes a top laminate 114 and a bottom laminate 116. The top laminate 114 and the bottom laminate 116 may also be referred to as top and bottom facings, respectively. The composite panel 100 may also be referred to as a composite sandwich panel, a honeycomb sandwich panel, and the like where the composite panel 100 includes the top laminate 114, the bottom laminate 116, and the honeycomb structure 108. The top laminate 114 and the bottom laminate 116 may be collectively referred to as laminates. The laminates includes mineral-additive modified basalt fiber reinforced PMMA thermoplastics. In this regard, the composite panel 100 may be referred to as a lightweight, sustainable, sandwich ballistic panel by reactive thermoplastic processing. The polymer matrix 102 may not impregnate the honeycomb structure 108 when the composite panel 100 includes the top laminate 114 and bottom laminate 116. Rather, the polymer matrix 102 is separated from the honeycomb structure 108.

The top laminate 114 and the bottom laminate 116 each include several layers of the woven fabrics. The top laminate 114 includes the top woven fabric 104. The bottom laminate 116 includes the bottom woven fabric 106. The top laminate 114 and the bottom laminate 116 thus includes the basalt fibers as exterior facings of the composite panel 100.

In some embodiments, the top laminate 114 include one or more of the inner woven fabrics 110. For example, the top laminate 114 includes the first set of one or more of the inner woven fabrics 110. The first set of one or more of the inner woven fabrics 110 may include the inner basalt fiber woven fabrics 110a and/or inner aramid fiber woven fabrics 110b. Although not depicted, the top laminate 114 may include the inner woven fabrics 110 which alternate between the inner basalt fiber woven fabrics 110a and inner aramid fiber woven fabrics 110b. In some embodiments, the bottom laminate 116 includes one or more of the inner woven fabrics 110. For example, the bottom laminate 116 includes the second set of one or more of the inner woven fabrics 110. The second set of one or more of the inner woven fabrics 110 may include the inner basalt fiber woven fabrics 110a and/or inner aramid fiber woven fabrics 110b. Although not depicted, the bottom laminate 116 may include the inner woven fabrics 110 which alternate between the inner basalt fiber woven fabrics 110a and inner aramid fiber woven fabrics 110b. In some embodiments, the top laminate 114 and the bottom laminate 116 each include between 2 and 6 layers of the woven fabrics (i.e., each including between one and 5 of the inner woven fabrics 110).

The top laminate 114 and the bottom laminate 116 are adhered to the honeycomb structure 108. The top laminate 114 and the bottom laminate 116 may be adhered to the honeycomb structure 108 using any suitable technique, such as, but not limited to, adhesive films 118 and/or welding.

In some embodiments, the top laminate 114 and the bottom laminate 116 are adhered to the honeycomb structure 108 by adhesive films 118. The adhesive films 118 is disposed between the top laminate 114 and the honeycomb structure 108. The adhesive films 118 are also disposed between the bottom laminate 116 and the honeycomb structure 108. The adhesive films 118 may undesirably increase a thickness of the composite panel 100 with minimal to no improvements in the mechanical strength.

In some embodiments, the honeycomb structure 108 is a thermoplastic. The top laminate 114 and the bottom laminate 116 may be adhered to the honeycomb structure 108 by welding the top laminate 114 and the bottom laminate 116 to the honeycomb structure 108 where the honeycomb structure 108 and the polymer matrix 102 are each thermoplastic. The welding may not significantly increase the thickness of the composite panel 100.

Figure 2:
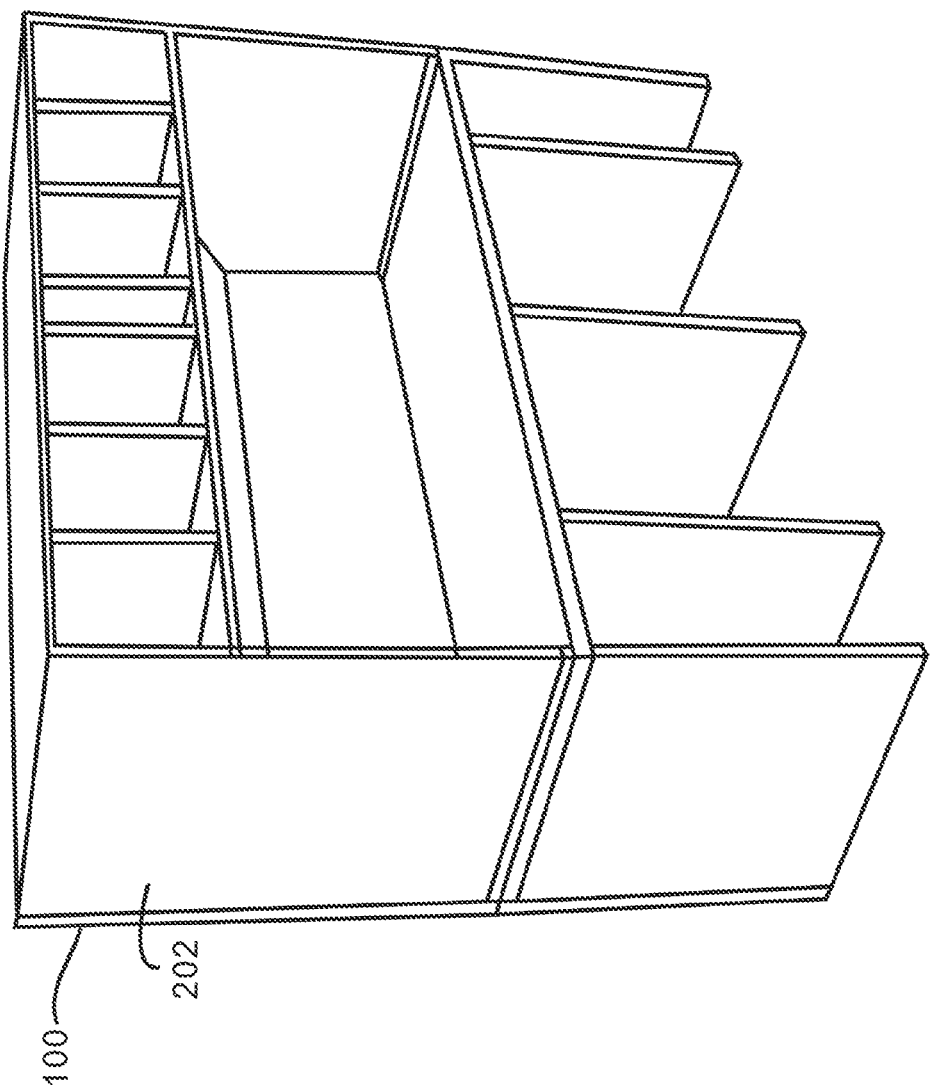
FIG. 2 depicts an aircraft monument including a composite panel, in accordance with one or more embodiments of the present disclosure.

Referring now to FIG. 2, an aircraft monument 200 is described, in accordance with one or more embodiments of the present disclosure. The aircraft monument 200 includes the composite panel 100. The aircraft monument 200 may include a galley, a lavatory, a stowage unit, or the like.

The composite panel 100 defines a rear surface of the aircraft monument 200. The composite panel 100 may be joined to one or more other panels 202 of the aircraft monument. For example, the composite panel 100 may be joined to one or more other panels 202 by a butt joint, or the like.

In some embodiments, the aircraft monument 200 is disposed in an aircraft between a passenger cab and a cockpit. Similarly, the composite panel 100 is disposed between the passenger cab and the cockpit. The composite panel 100 divides the cockpit and the passenger cab. The composite panel is used to provide ballistic protection the cockpit. The composite panel 100 provides ballistic resistance for the cockpit from bullets fired from the passenger cab.

Referring generally again to FIGS. 1A-2, the composite panel 100 may be ballistic resistant. The composite panel 100 may be ballistic resistant to 9 mm full metal jacket (FMJ) and .44 Magnum jacketed hollow point (JHP) bullets. The composite panel 100 is compliant with Ballistic penetration tests according to AITM 1-0052 Section 2.2 (9 mm FMJ and .44 Magnum JHP bullets). The penetration resistance is expressed by citing the impacting velocity at which 50% of the projectiles penetrate the composite while 50% are stopped by the composite, also known as the V50 value. The composite panel 100 has a V50 of at least 1550 feet/second (fps) (472 m/sec) when impacted with a 9 mm full metal jacket (FMJ) bullet and a V50 of at least 1550 fps when impacted with a .44 magnum bullet.

In some embodiments, the composite panel 100 meets and/or exceeds transportation guidelines and/or standards, such as aviation guidelines and/or standards, by being configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For example, the composite panel 100 may be required to meet and/or exceed flame tests as set forth by the aviation guidelines and/or standards. For instance, the passenger seat components may be rated to pass flame requirement tests for aircraft cabin interior installations (e.g., structures or components) as set forth by the aviation guidelines and/or standards under 14 C.F.R. Part 25 and its Appendixes (e.g., 14 C.F.R. § 25.853, also found in FAA Advisory Circular (AC) 25.853-1), or the like. For example, the composite panel 100 is fire resistant according to FAR 25.853—title 14 CFR part 25 appendix F part IV(a) through (h).

The composite panel 100 includes a thickness. For example, the composite panel 100 includes a thickness of between 3 mm and 7 mm. By way of another example, the composite panel 100 include a thickness of between 3 and 6 mm. By way of another example, the composite panel 100 include a thickness of between 4 and 5.5 mm. By way of another example, the composite panel 100 includes a thickness of between 5 and 10 mm. The composite panel 100 includes the ballistic resistance with the thickness. The thickness of the composite panel 100 is based on the number of layers of woven fabric and the areal weight of the woven fabric. Areal weight may also be referred to as areal density. Areal weight refers to the weight of the woven fabric divided by the surface area. A higher areal weight may require a fewer number of layers to achieve a same thickness. In some embodiments, the woven fabrics includes an areal weight of 400 grams per square meter (GSM).

The composite panels 100 may be relatively light weight. The composite panels 100 may be relatively light weight due to requiring fewer of the woven fabric layers to achieve the ballistic resistance using the polymer matrix and the woven fabric.

In some embodiments, the composite panel 100 may be fabricated using liquid resin processing. For example, the composite panel 100 may be fabricated using resin infusion, resin transfer molding (RTM), compression molding, high pressure resin fusion, vacuum bagging, and the like. In some embodiments, the composite panels 100 are fabricated by vacuum assisted RTM or compression RTM. It is contemplated that the RTM may be desirable because the RTM may prevent saturation of the polymer matrix 102.

The compression RTM may include forming a dry fabric preform. The dry fabric preform is made of the top woven fabric 104, the bottom woven fabric 106, the inner woven fabrics 110, and/or the honeycomb structure 108. The resin is then molded into the dry fabric preform to impregnate each of the woven fabrics 104, the woven fabrics 106, and/or the honeycomb structure 108. The dry fabric preform is positioned inside a lower mold. An upper mold is then closed onto the lower mold over the dry fabric preform. The lower mold and the upper mold define a cavity with an inlet. The cavity is filled with a resin including the acrylate monomers via the inlet. The upper mold then moves towards the lower mold to compress the resin and the dry fabric preform. The resin then infiltrates the dry fabric preform. The mold is now completely closed and the dry fabric preform is impregnated with the resin. The resin may then be cured to form the polymer matrix 102. The resin may be cured at a temperature. For example, the resin may be cured at a temperature between 20 and 60° C.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A composite panel comprising:
   a top woven fabric;
   a bottom woven fabric; wherein each of the top woven fabric and the bottom woven fabric comprise a plurality of basalt fibers;
   a plurality of inner woven fabrics; wherein the plurality of inner woven fabrics are disposed between the top woven fabric and the bottom woven fabric;
   a polymer matrix; wherein the polymer matrix comprises Poly(methyl methacrylate) (PMMA); and
   a honeycomb structure; wherein the honeycomb structure is disposed between the top woven fabric and the bottom woven fabric; wherein the honeycomb structure is disposed between two or more of the plurality of inner woven fabrics;
   wherein the top woven fabric, the bottom woven fabric, the plurality of inner woven fabrics, and the honeycomb structure are impregnated by the polymer matrix; wherein the polymer matrix fills voids gaps between warp fibers and weft fibers of the top woven fabric, the bottom woven fabric, and the plurality of inner woven fabrics; wherein the polymer matrix is disposed within cells of the honeycomb structure; wherein the polymer matrix acts as a unitary layer with the top woven fabric, the bottom woven fabric, the plurality of inner woven fabrics, and the honeycomb structure.

2. The composite panel of claim 1, wherein the PMMA is formed by in-situ polymerization of at least a plurality of acrylate monomers.

3. The composite panel of claim 2, wherein the plurality of acrylate monomers are (meth)acrylic monomers.

4. The composite panel of claim 1, wherein the plurality of basalt fibers are mineral-additive modified basalt fibers.

5. The composite panel of claim 4, wherein the mineral-additive comprises at least one of copper or aluminum.

6. The composite panel of claim 1, wherein the polymer matrix comprises a fire-retardant additive.

7. The composite panel of claim 1, wherein the plurality of inner woven fabrics comprise a plurality of inner basalt fiber woven fabrics.

8. The composite panel of claim 1, wherein the plurality of inner woven fabrics comprises a plurality of inner basalt fiber woven fabrics comprising a plurality of aramid fibers.

9. The composite panel of claim 1, wherein the plurality of inner woven fabrics comprises a plurality of inner basalt fiber woven fabrics and a plurality of inner aramid fiber woven fabrics.

10. The composite panel of claim 9, wherein the plurality of inner woven fabrics alternate between the plurality of inner basalt fiber woven fabrics and the plurality of inner aramid fiber woven fabrics along a thickness of the composite panel.

11. The composite panel of claim 1, wherein the composite panel is ballistic resistant, wherein the composite panel has a V50 value of at least 472 m/sec when impacted with a 9 mm full metal jacket bullet.

12. An aircraft monument comprising:
    a composite panel comprising:
       a top woven fabric;

a bottom woven fabric; wherein each of the top woven fabric and the bottom woven fabric comprise a plurality of basalt fibers;

a plurality of inner woven fabrics; wherein the plurality of inner woven fabrics are disposed between the top woven fabric and the bottom woven fabric;

a polymer matrix; wherein the polymer matrix comprises Poly(methyl methacrylate) (PMMA); and a honeycomb structure; wherein the honeycomb structure is disposed between the top woven fabric and the bottom woven fabric; wherein the honeycomb structure is disposed between two or more of the plurality of inner woven fabrics;

wherein the top woven fabric, the bottom woven fabric, the plurality of inner woven fabrics, and the honeycomb structure are impregnated by the polymer matrix; wherein the polymer matrix fills voids gaps between warp fibers and weft fibers of the top woven fabric, the bottom woven fabric, and the plurality of inner woven fabrics; wherein the polymer matrix is disposed within cells of the honeycomb structure; wherein the polymer matrix acts as a unitary layer with the top woven fabric, the bottom woven fabric, the plurality of inner woven fabrics, and the honeycomb structure.

13. The aircraft monument of claim 12, wherein the aircraft monument is a galley.

14. The aircraft monument of claim 12, wherein the aircraft monument is disposed in an aircraft such that the composite panel is disposed between the passenger cab and the cockpit, wherein the composite panel provides ballistic protection to the cockpit from bullets fired from the passenger cab.

15. The aircraft monument of claim 12, wherein the composite panel defines a rear surface of the aircraft monument, wherein the aircraft monument comprises one or more other panels, wherein the composite panel is joined to the one or more other panels by a butt joint.

* * * * *